Aug. 2, 1927.  W. F. BROWN  1,637,632
VEHICLE FENDER
Filed Nov. 29, 1926     2 Sheets-Sheet 2
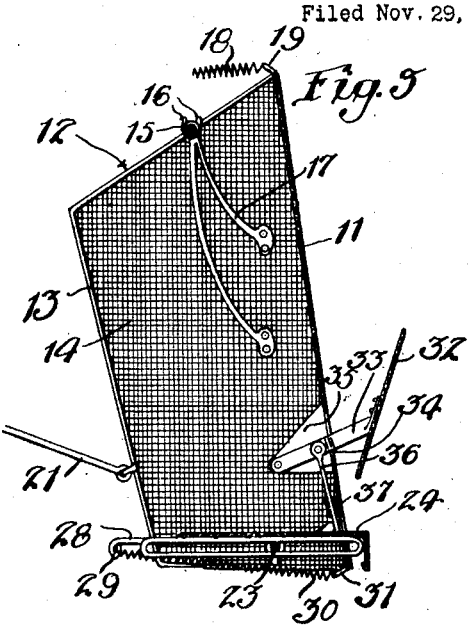
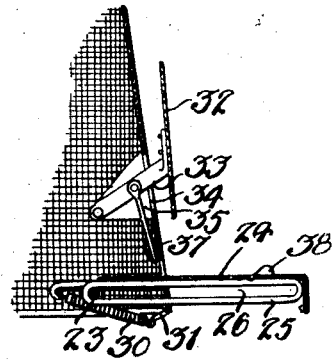
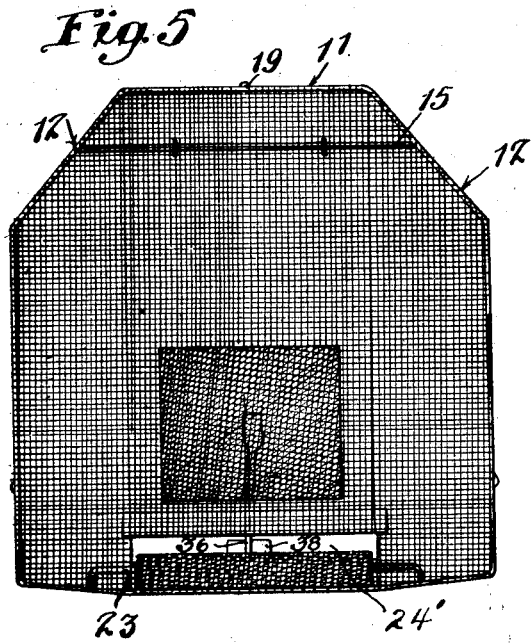
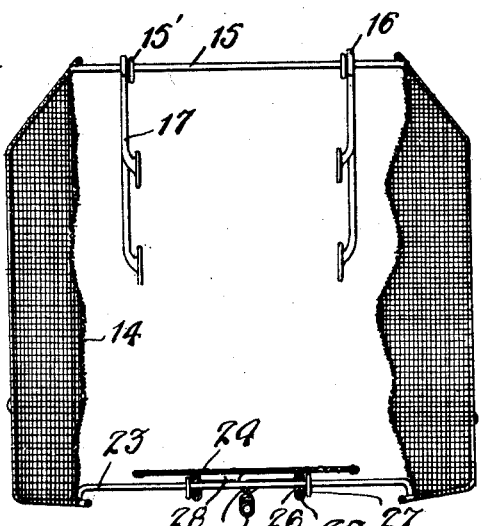
William F. Brown,
Inventor
By William L. Symons
Attorney Patented Aug. 2, 1927.

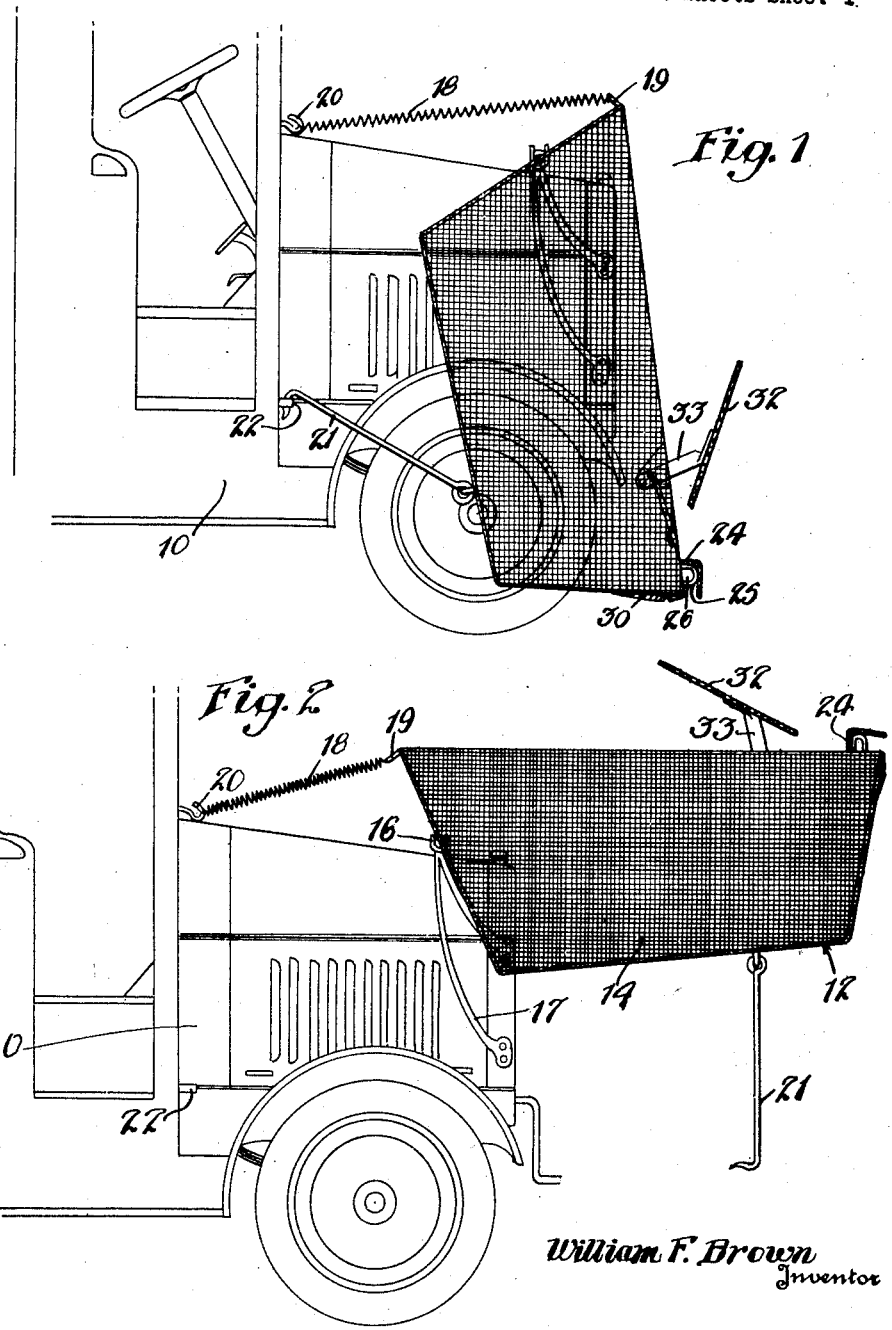

1,637,632

UNITED STATES PATENT OFFICE.

WILLIAM F. BROWN, OF TOTTENVILLE, NEW YORK.

VEHICLE FENDER.

Application filed November 29, 1926. Serial No. 151,466.

My invention relates to improvements in safety devices and more particularly to fenders for vehicles.

The usual fender or bumper is so arranged that when a person is struck by a vehicle, he is likely to be thrown beneath the wheels of the car or against the portion of the car above the bumper or fender, with the result that the person struck is usually seriously injured. An important object of my invention is the provision of a fender or safety device which will obviate these difficulties.

Another object of my invention is the provision of a device of this character which will not interfere with cranking the vehicle.

A further object of my invention is to provide a device of the above mentioned character which may be readily attached to or detached from the vehicle.

Other objects and advantages of my invention will be apparent during the course of the following description.

In the accompanying drawings which form a part of this specification and wherein like characters of reference denote like or corresponding parts throughout the same, Figure 1 is a side elevation of a vehicle equipped with my invention, Figure 2 is a similar view showing the fender in raised position to allow cranking of the vehicle, Figure 3 is a vertical longitudinal section through the fender, Figure 4 is a similar, but fragmentary section, showing the platform in extended or released position, Figure 5 is a front elevation of the fender, and, Figure 6 is a vertical transverse section therethrough.

In the drawings wherein for the purpose of illustration is shown a preferred embodiment of my invention, the numeral 10 designates a vehicle upon which my improved fender is mounted. The fender comprises a front panel 11 with rearwardly inclined and tapering side wings 12. The outline of the fender is defined by a light metal frame 13 covered by a wire mesh or screen 14. A horizontal cross piece or rod 15 connects the top of the frame forming the wings adjacent the center of said wings and is adapted to fit into the U-shaped ends 16 of supports 17 which comprise diverging arms connected at their ends to the vehicle. The supports are illustrated as connected to the radiator shell of the vehicle but may be applied to any suitable portion of said vehicle. Stops 15' on the rod 15 prevent lateral displacement of the same with respect to the supports.

A coil spring 18 connects a loop 19 formed at the center of the front panel with a hook or the like 20 on the vehicle rearwardly of the supports 17. The tendency of this spring is to pivot the fender on the supports until it assumes a substantially horizontal position. The fender is held in a substantially vertical position against the tension of the spring 18 by means of hook-ended members 21 pivotally secured to the lower portions of the side wings 12 and adapted to engage loops 22 on the sides of the vehicle.

A lower horizontal cross rod 23 connects the lower ends of the wings and serves as a support or guide for a sliding platform 24, also of wire mesh, having its forward end bent downwardly at right angles to the platform. The panel 11 is provided with a transverse slot 24' to receive the platform. The platform is provided with spaced runners or supports 25 provided with longitudinal slots 26 through which the rod 23 passes. Stops 27 are arranged on the rod 23 immediately adjacent the runners 25 to prevent lateral displacement of the runners on the rod 23. The runners 25 are connected at their rear ends by the extension 28 which is coiled upon itself to form a loop 29 to receive one end of a coil spring 30, the other end of which engages a loop 31 on the lower portion of the frame of the front panel 11, adjacent its center.

A trigger element is arranged on the front panel 11 above the platform 24 centrally of the panel and comprises a rectangular face 32 also of wire mesh, which is supported upon an arm 33 which passes through an elongated vertically arranged slot 34 in the panel 11 and is pivotally secured at its end to an inwardly projecting support 35 which is fastened to the rear face of the panel 11.

A rod 36 is pivotally fastened to the arm 33 between the ends of said arm and passes downwardly through a guide 37 in which it is adapted to slide. A stop or catch 38 is arranged on the upper surface of the platform in alignment with the rod 36, the rear face of the stop being inclined.

In operation the platform 24 is pushed rearwardly against the tension of the coil spring 30 until the inclined face of the stop 38 raises the rod 36, thereby raising the arm 33 and trigger 32, and the rod 36 drops down in front of the stop 38, as shown in Figure 3. In this position the platform is in its retracted position, held by the rod 36 and stop 38 and the trigger 32 is in its forward position. If a person is struck, the trigger 32 will be forced rearwardly, thereby raising the rod 36 and allowing the platform 24 to be projected forwardly by the coil spring 30 as shown in Figure 4. The platform will catch the person struck and prevent him from going beneath the vehicle. The fender will save the person struck from injury due to his head or body striking the radiator or frame of the vehicle.

When it is desired to crank the vehicle, or put water into the radiator, the hooks 21 are disengaged from the loops 22 and the tension of the coil spring 18 will cause the fender to pivot about the supports 17 until it reaches the position shown in Figure 2. When the fender is in this position, there is enough head room for cranking the car, or putting water into the radiator.

While I have shown and described the preferred embodiment of my invention, it is to be understood that various changes in the size, shape and arrangement of parts may be resorted to without departing from the spirit of my invention or the scope of the subjoined claims.

Having thus described my invention what I claim and desire to protect by Letters Patent is:

1. A safety device for vehicles comprising a fender adapted to be arranged in a substantially vertical position in front of the vehicle, and means whereby the fender may be swung away from in front of the vehicle to give access to the front of the vehicle.

2. A safety device for vehicles comprising a fender having a front panel, and inclined side panels, the fender being normally arranged in front of the vehicle, and means whereby the fender may be swung away from in front of the vehicle to permit access to the entire front of said vehicle.

3. A safety device for vehicles comprising a fender having a frame covered with wire mesh, said frame being shaped to form a front panel and rearwardly inclined side wings, said fender being normally arranged in front of the vehicle but being capable of being swung entirely away from in front of the vehicle to give access thereto.

4. A safety device for vehicles comprising a support on said vehicle, a fender pivotally arranged on said support and normally arranged in front of said vehicle, and means to pivot the fender on said support to swing it away from in front of the vehicle to give access to the front of the vehicle.

5. A safety device for vehicles comprising a support on the vehicle, a fender pivotally engaging said support, resilient means engaging said fender and tending to swing it away from in front of the vehicle to give access thereto, and means to hold the fender in front of the vehicle against the tension of said resilient means.

6. A safety device for vehicles comprising a support on the vehicle, a fender pivotally engaging the support above the vehicle hood, a spring arranged above the support and engaging the fender and means arranged below the support to hold the fender in front of the vehicle against the tension of the spring.

7. A safety device for vehicles comprising a fender, a platform slidably secured thereto, resilient means engaging said platform to project the same forwardly of the fender, a trigger arranged in advance of the fender, means connected to said trigger to engage the platform and hold it in its retracted position against the tension of the resilient means and means whereby when pressure is applied to the trigger, the platform will be released and projected by the resilient means.

8. A safety device for vehicles comprising a fender having a front panel and side wings, a cross piece connecting the upper portions of the wings, a support on the vehicle adapted to pivotally receive the cross piece, resilient means engaging the fender, means holding the fender in front of the vehicle against the tension of the resilient means, a lower cross piece connecting the lower portions of the wings, a platform having elongated slots, slidably engaging the lower crosspiece, a spring engaging the platform to project the same forwardly of the fender, means to engage the platform to hold it in its retracted position against the tension of the spring, and means to release the platform and allow it to be projected by the spring.

9. A safety device for vehicles comprising a fender having a front panel adapted to be arranged in front of the vehicle, rearwardly inclined side panels on said front panels, a platform slidably engaging the front panel, means connecting the side panels and spaced from said front panel and slidably receiving the platform, resilient means engaging the platform and tending to project the platform forwardly, means to engage the platform to hold it in its retracted position against the tension of the resilient means, and means to release the platform, and allow it to be projected by the resilient means.

10. A safety device for vehicles comprising a fender having a front panel adapted to be arranged in front of the vehicle, rearwardly inclined side wings on said front panel, a pivot member connecting the side wings and arranged in spaced relation to the front panel at a substantial distance below the top thereof, a support on said vehicle adapted to receive the pivot member, a spring arranged above the support and the pivot member and having one end secured behind the pivot member and its other end secured to a portion of the front panel above the pivot member, and means arranged below the pivot member to hold the fender in front of the vehicle against the tension of the spring.

In testimony whereof I affix my signature.

WILLIAM F. BROWN.